(12) United States Patent
Morris et al.

(10) Patent No.: US 7,158,330 B2
(45) Date of Patent: Jan. 2, 2007

(54) METHOD AND APPARATUS FOR SERVO TRACK WRITING BY TRACK FOLLOWING ON A DEDICATED SERVO DISK ON A FLUID SPINDLE BEARING

(75) Inventors: Frank Ivan Morris, San Jose, CA (US); Nikollay Ivanov, Campbell, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 121 days.

(21) Appl. No.: 10/005,772

(22) Filed: Nov. 8, 2001

(65) Prior Publication Data

US 2003/0086196 A1 May 8, 2003

(51) Int. Cl.
*G11B 21/02* (2006.01)
*G11B 5/596* (2006.01)

(52) U.S. Cl. ...................... 360/75; 360/77.02

(58) Field of Classification Search ............ 360/98.07, 360/75, 77.02, 77.05; 384/114, 110
See application file for complete search history.

(56) References Cited

U.S. PATENT DOCUMENTS

| | | | |
|---|---|---|---|
| 4,371,902 A | | 2/1983 | Baxter et al. |
| 4,414,589 A | * | 11/1983 | Oliver et al. ............ 360/77.07 |
| 4,531,167 A | * | 7/1985 | Berger ..................... 360/77.02 |
| 4,539,662 A | | 9/1985 | Hatano et al. |
| 4,757,402 A | | 7/1988 | Mo |
| 4,980,783 A | * | 12/1990 | Moir et al. .............. 360/77.02 |
| 5,036,408 A | | 7/1991 | Leis et al. |
| 5,255,136 A | | 10/1993 | Machado et al. |
| 5,333,140 A | | 7/1994 | Moraru et al. |
| 5,375,020 A | * | 12/1994 | Aggarwal et al. ............ 360/75 |
| 5,448,429 A | | 9/1995 | Cribbs et al. |
| 5,541,784 A | * | 7/1996 | Cribbs et al. ................ 360/75 |
| 5,550,692 A | | 8/1996 | Crane |
| 5,570,247 A | | 10/1996 | Brown et al. |
| 5,581,420 A | | 12/1996 | Chainer et al. |
| 5,606,469 A | | 2/1997 | Kosugi et al. |
| 5,615,058 A | | 3/1997 | Chainer et al. |
| 5,642,943 A | * | 7/1997 | Szeremeta .................. 384/100 |
| 5,659,436 A | | 8/1997 | Yarmchuk et al. |
| 5,710,677 A | | 1/1998 | Teng et al. |
| 5,771,126 A | | 6/1998 | Choi |
| 5,771,130 A | | 6/1998 | Baker |
| 5,771,131 A | | 6/1998 | Pirzadeh |
| 5,796,542 A | * | 8/1998 | Szeremeta ............... 360/77.02 |
| 5,796,543 A | | 8/1998 | Ton-That |
| 5,798,883 A | | 8/1998 | Kim |
| 5,867,337 A | | 2/1999 | Shimomura |
| 5,892,634 A | | 4/1999 | Ito et al. |
| 5,894,374 A | * | 4/1999 | Moraru ........................ 360/75 |
| 5,917,670 A | | 6/1999 | Scaramuzzo et al. |
| 5,941,644 A | * | 8/1999 | Takahashi ................... 384/112 |
| 5,946,157 A | | 8/1999 | Codilian et al. |
| 6,049,437 A | | 4/2000 | Wevers |

(Continued)

*Primary Examiner*—K. Wong
(74) *Attorney, Agent, or Firm*—Ben J. Yorks; Irell & Manella LLP (57) ABSTRACT

What is disclosed is a method and apparatus for writing servo information on disks to be used in a hard disk drive assembly. In one embodiment, servo information is pre-written onto a disk using an offline servo track writer which employs a fluid dynamic bearing spindle to rotate the disk(s) during read/write operations. In another embodiment, servo information is written onto a disk by a method of track following on a reference disk using an offline servo track writer.

26 Claims, 6 Drawing Sheets

U.S. PATENT DOCUMENTS

| | | |
|---|---|---|
| 6,262,859 B1 | 7/2001 | Cho |
| 6,315,452 B1 * | 11/2001 | Titcomb .................... 384/114 |
| 6,445,540 B1 * | 9/2002 | Toffle et al. ................ 360/137 |
| 6,505,968 B1 * | 1/2003 | Fleury et al. .................. 384/1 |
| 6,600,628 B1 * | 7/2003 | Kilmer .................... 360/99.12 |

* cited by examiner

METHOD AND APPARATUS FOR SERVO TRACK WRITING BY TRACK FOLLOWING ON A DEDICATED SERVO DISK ON A FLUID SPINDLE BEARING

BACKGROUND

1. Field

The applicant's disclosure relates generally to disk drives and more particularly to an improved method and apparatus for servo track writing disks used in a hard disk drive assembly.

2. Description of the Related Art

Disk drives are magnetic recording devices used for the storage of information. The information is recorded on concentric tracks on either surface of one or more magnetic recording disks. The disks are rotatably mounted to a spin motor and information is accessed by means of read/write heads that are mounted to actuator arms which are rotated by a voice coil motor. The voice coil motor is excited with a current to rotate the actuator and move the heads. The read/write heads must be accurately aligned with the storage tracks on the disk to ensure proper reading and writing of information.

There are two general types of servo systems whereby the actuator is controlled utilizing servo information which has been recorded on one or more of the disks in the hard disk drive. The first such servo system is generally referred to as a dedicated servo system. With this servo system one disk surface is devoted to containing servo information. One of the read/write heads is then used to read the dedicated servo disk and to provide position information such that the positions of the other read/write heads in the hard disk assembly may be obtained. A second type of servo system is commonly known as an embedded sector servo system. With this servo system, rather than using a single disk surface to contain servo information, the servo information is stored in specific sectors across several or all of the disks in the hard disk drive assembly. Moreover, the servo information may be recorded either prior to assembly of the hard disk drive, or after assembly.

In either case, the servo information must be recorded, or servo written, onto the disk surface using a highly precise encoding system. The current method for servo writing utilizes a mechanical pushpin. With this system, a mechanical pushpin is attached to a master actuator arm at one end and extends into the hard drive through an access slot on the other end. The master actuator arm is controlled using a positioner in a closed loop with a highly accurate encoder. In addition, a clock head is directed to write a clock track onto a disk to serve as a timing reference during the servo writing process.

This process suffers from problems associated with non-repetitive run-out ("NRRO"), disk flutter and motor rocking, all of which serves to degrade the accuracy of the position information written during the servo writing process. Moreover, the use of a positioner/encoder greatly increases the expense associated with the servo writing process.

A second method of servo writing that has been used is the traditional offline servo track writing method. With this method, each disk is servo written using an offline servo track writer before being installed into a hard drive assembly. While this method has the benefit of increased accuracy due to the fact that it does not use a pushpin, such traditional systems are still dependent on the use of a positioner and precision encoder, thereby dramatically increasing the expense associated with the use of this method.

Another issue with traditional offline track writing is the error introduced by the bearing assembly of the spindle motor used to rotate the disk during the writing process. Traditional ball bearing assemblies suffer from mechanical drawbacks, such as excessive wear and run out. Increasing the data density of a disk can be limited by NRRO. The spindle bearing is the primary contributor to increasing NRRO. Moreover, improved NRRO improves seek time and ability to track follow for a servo writer. To alleviate these problems, air-bearing spindles have been used for traditional offline track writing purposes. Air-bearing spindles are able to reduce NRRO by reducing the amount of surface-to-surface contact in the spindle. However, air-bearing spindles dramatically increase the expense of using an offline servo writing system.

Therefore, there is a need in the art for an improved method and apparatus for servo writing that does not suffer from these drawbacks.

BRIEF SUMMARY

A method and apparatus for servo track writing is disclosed. In one embodiment, the method comprises coupling a reference disk and a copy disk to a spindle motor of a servo track writer, and reading the reference disk with a read head of the servo track writer where the reference disk includes a plurality of tracks containing servo information. The method further comprises writing the servo information onto a copy disk using a write head of the servo track writer before the copy disk is incorporated into a hard disk drive assembly. In one embodiment, the reference disk and the disk are rotated using a fluid dynamic bearing spindle.

DETAILED DESCRIPTION

The applicant discloses a method and apparatus for writing servo information on disks for use in a hard disk drive assembly. In one embodiment, servo information is pre-written onto a disk using an offline servo track writer which employs a fluid dynamic bearing spindle ("FDB spindle") to rotate the disk(s) during read/write operations.

Another aspect of the applicant's disclosure relates to pre-writing a disk with servo information before the disk is incorporated into the disk stack of a hard disk drive. According to one embodiment, servo information is written onto a disk by track following on a reference disk using an offline servo track writer.

Figure 1:
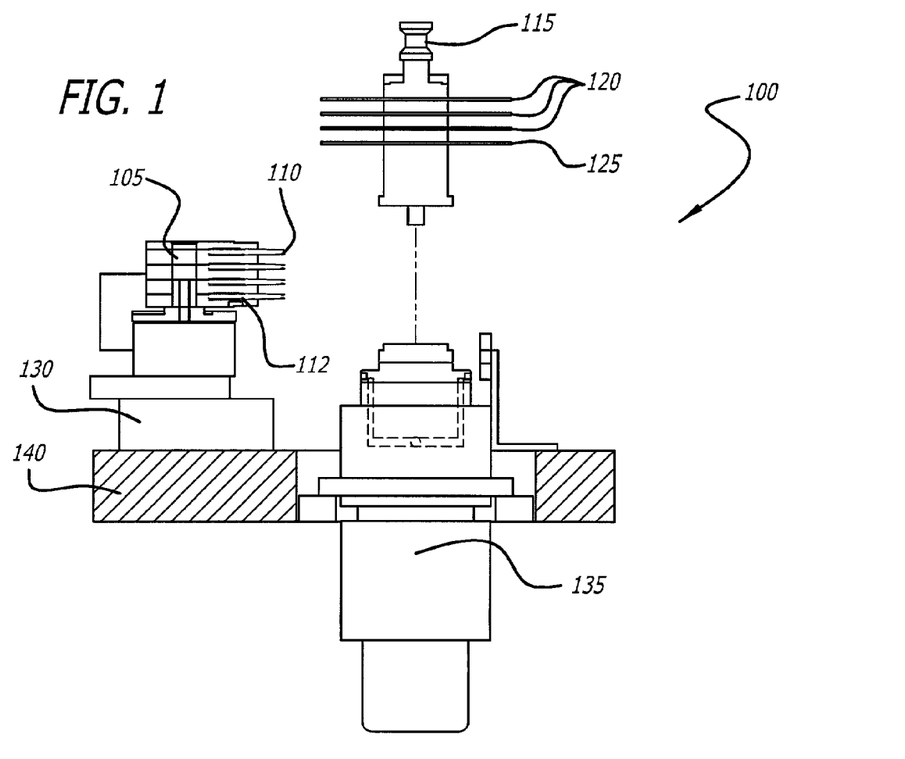
FIG. 1 is a cross-section of an offline servo track writer, according to one embodiment.

Referring first to FIG. 1, a servo track writer 100, according to one embodiment, is depicted. The servo track writer 100 includes an actuator 105 which functions to position the read/write heads 110 over desired locations on servo-copy disks 120 and reference disk 125. The actuator 105 may have one or more actuator arms 112 connected to the read/write heads 110. Moreover, the actuator 105 may be connected to a voice coil motor ("VCM") (not shown) which generates a torque when supplied with a current. This torque may then rotate the actuator arms 112 connected to the actuator and move the read/write heads 110 across the surface of the servo-copy disks 120 and reference disk 125.

The read/write heads 110 can write and read information on a rotating disk by magnetizing and sensing the magnetic field of a disk surface. Moreover, a read transducer of the read/write heads 110 may be constructed from a magneto-resistive (MR) material.

Figure 2:
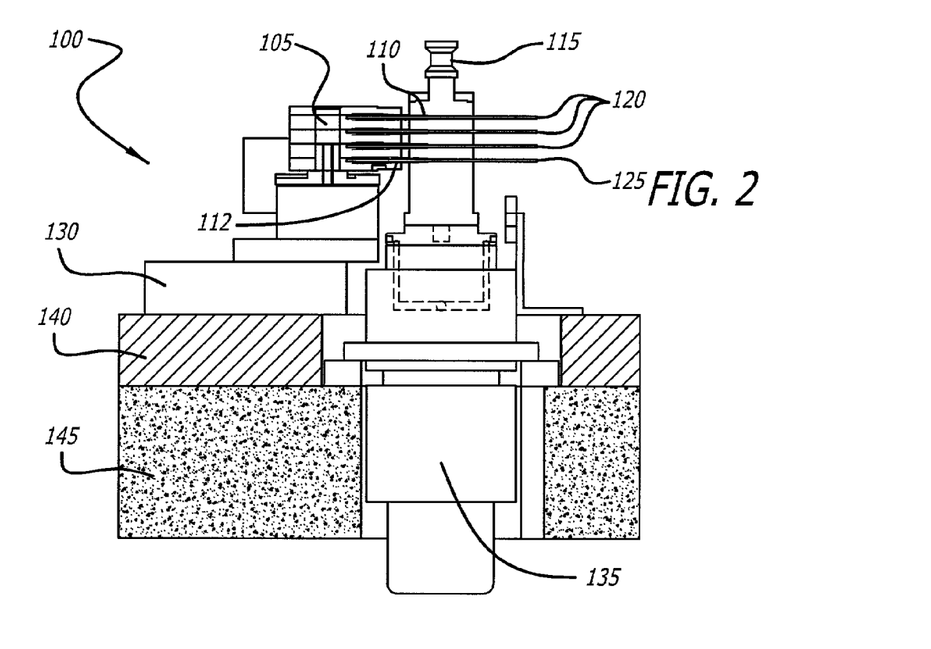
FIG. 2 is another embodiment of a cross-section of an offline servo track writer.

The actuator 105 may be mounted to a slide-motion mechanism 130 to facilitate the insertion and extraction of the chuck 115, the servo-copy disks 120, and the reference disk 125. In particular, the slide-motion mechanism 130, which is secured to a fixed surface 140, functions to move the actuator in the direction of the chuck 115, thereby bringing the read/write heads 110 within the vicinity of the servo-copy disks. It should be appreciated that the slide-motion mechanism 130 may move the actuator in other directions as well. As depicted in FIGS. 1 and 2, the chuck 115 is a four-disk self-centering chuck. However, it is to be understood that the chuck 115 may be made to hold some other number of disks.

The servo-copy disks 120, in one embodiment, have radially concentric tracks. In one embodiment, data is to be stored within subdivisions of these tracks known as sectors. One of the steps in preparing a disk to have data written to these sectors is to encode the disk with servo information. As mentioned above, this servo information is used by the servo system to accurately position the read/write heads during read/write operations. To this end, the servo track writer 100 is used to record servo information to the servo-copy disks 120, according to one embodiment. As described in more detail below, servo information on the reference disk 125 may be copied by a track following method to the servo-copy disks 120.

The reference disk 125 contains pre-written servo information, according to one embodiment. While in one embodiment the servo information on the reference disk 125 is consistent with a dedicated servo system, in another embodiment the reference disk 125 contains servo information consistent with an embedded sector servo system. In either case, the servo information on the reference disk 125 may be servo written to the reference disk 125 using a traditional offline servo track writer, or may be comprised of a phase modulated servo pattern which is encoded onto the reference disk 125. U.S. Pat. No. 4,549,232, which is hereby incorporated by reference, discloses one such method for encoding and using such a phase modulated servo pattern. It should further be appreciated that other commonly known methods of encoding the reference disk 125 with servo information may be used.

The FDB spindle 135 is used to rotate the chuck 115 during read/write operations on the servo-copy disks 120 and reference disk 125. As mentioned above, an FDB spindle 135 is used instead of a ball bearing or air-bearing spindle, according to one embodiment. The film of lubricant in the FDB spindle 135 provides viscous damping thereby reducing NRRO below that seen with ball bearing assemblies and comparable to NRRO levels experienced with air-bearing spindles. Moreover, using an FDB spindle reduces the cost associated with offline servo track writing since FDB spindles typically cost a fraction of what air-bearing spindles cost. While in one embodiment the fluid used in the FDB spindle 135 is oil, it should appreciated that other fluids may be used.

It should further be noted that FIG. 1 depicts the offline servo track writer 100 with the chuck 115 not inserted onto the FDB spindle 135 and with the actuator 105 out of read/write position. In contrast, FIG. 2 depicts the offline servo track writer 100 of FIG. 1, with the chuck 115 inserted onto the FDB spindle 135 and with the actuator 105 in position to read/write. Moreover, as shown in FIG. 2 the surface 140 may be further attached to a granite table 145 to improve accuracy during read/write operations. In another embodiment, the slide-motion mechanism 130 is attached directly to the granite table 145.

Figure 3:
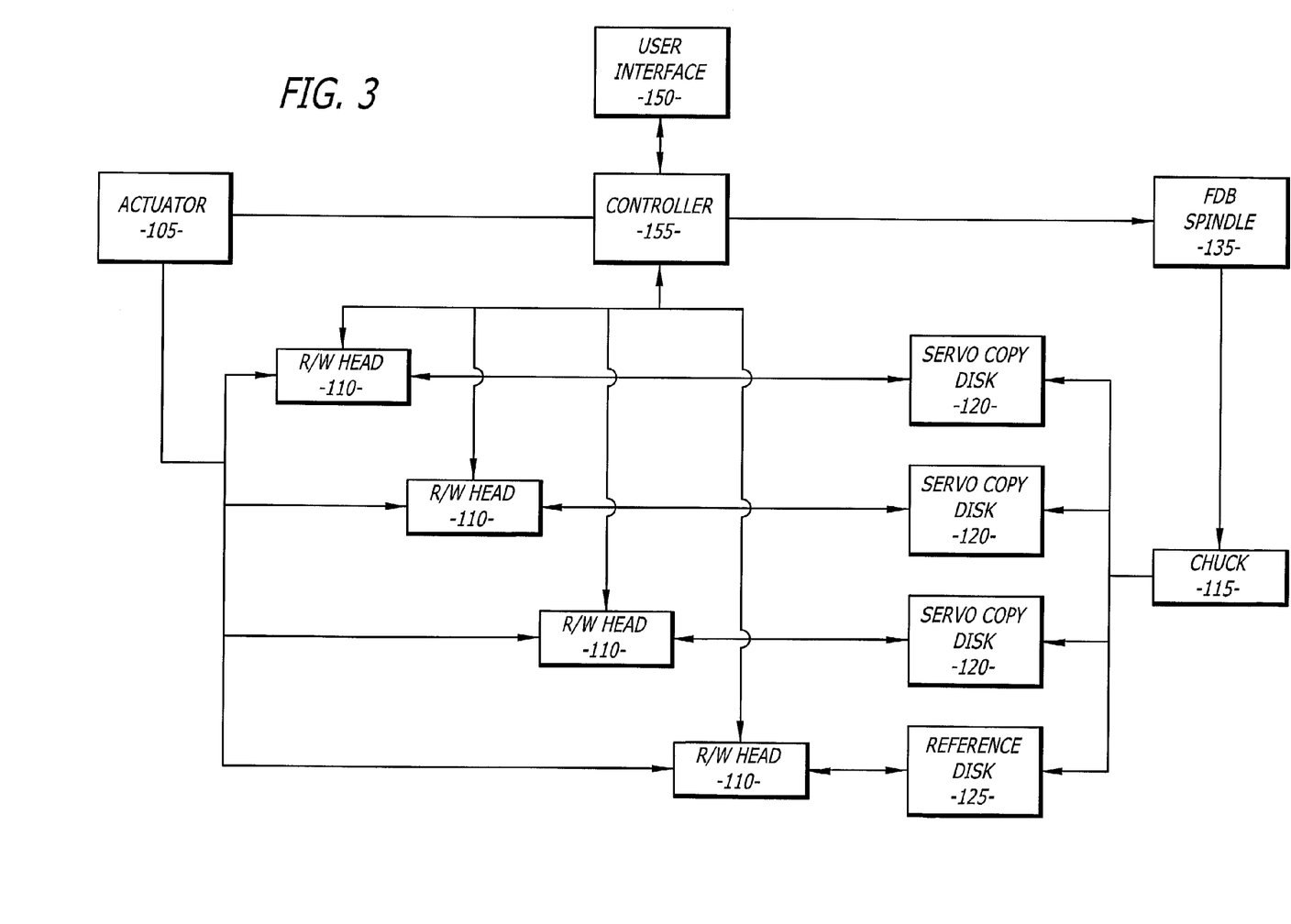
FIG. 3 is a schematic of an offline servo track writer, according to one embodiment.

Referring now to FIG. 3, an organization diagram of the offline servo track writer 100 is depicted. A user interface 150 is in communication with a controller 155 of the servo track writer 100. The user interface 150 may include buffer memory and control circuitry which allows the servo track writer 100 to interface with a system such as a personal computer. Circuitry details of the controller 155 will be further described below.

The controller 155 is connected to the actuator 105 and the FDB spindle 135, according to one embodiment. In another embodiment, the controller 155 is connected to the slide-motion mechanism 130 and is capable of moving the slide-motion mechanism 130 and the attached actuator 105 in and out of read/write position.

The controller 155 may direct the VCM of the actuator such that the read/write heads 110 attached to the actuator arms are rotated to a desired position. The controller 155 may further direct the FDB spindle 135, to which the chuck 115 is attached, to spin at desired times and/or intervals. While FIGS. 1 and 2 depict the chuck as having three servo-copy disks 120, the chuck 115 may contain a different number of servo-copy disk 120. Moreover, the chuck 115 should also contain at least one reference disk 125, but may contain more.

Each servo-copy disk 120 and reference disk 125 has an associated read/write head 110 capable of reading and writing from the particular disk's surface. As mentioned earlier, the read/write heads 110 will typically be connected to actuator arms 112 of the actuator 105.

Figure 4:
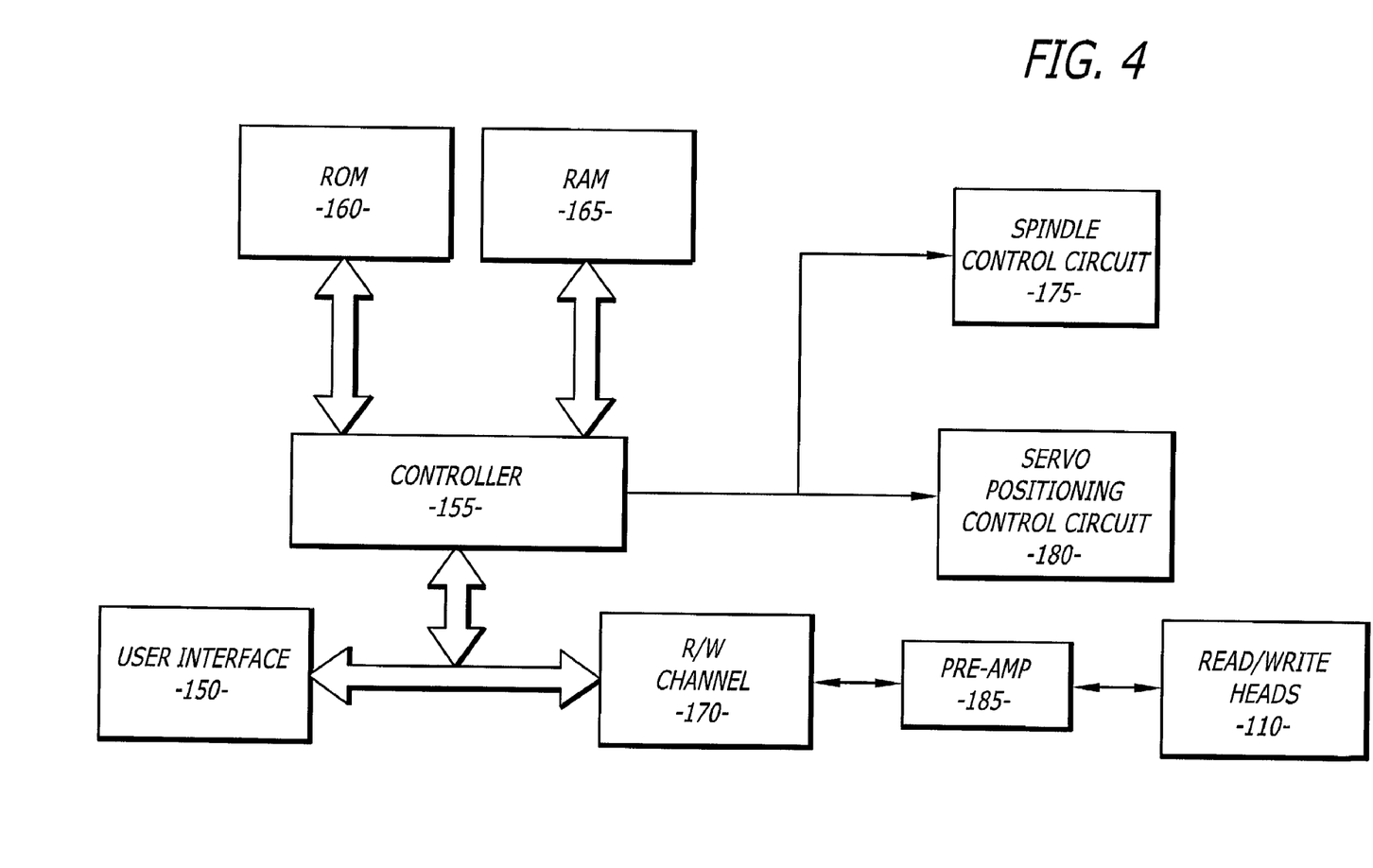
FIG. 4 is another schematic of an offline servo track writer, according to one embodiment.

Referring now to FIG. 4, a schematic block diagram of the offline servo track writer 100 is depicted. The controller 155 may include, for example, a digital signal processor (DSP) or other microprocessor-based device. The controller 155 may be coupled to the read/write heads 110 by a read/write channel circuit 170 and a pre-amplifier 185. The controller 155 may provide read/write signals via the read/write channel 170 to read from the reference disk 125 or write to the servo-copy disks 120. The user interface 150 is also connected to the controller 155. While in FIG. 4 the user interface 150 is also shown to be connected to the read/write channel, in another embodiment the user interface 150 is connected only to the controller 155. The user interface 150 may also include buffer memory and control circuitry which allows the servo track writer 100 to interface with a system such as a personal computer.

In one embodiment, the controller 155 is connected to a spindle control circuit 175 to rotate the FDB Spindle and the chuck 115 attached thereto. The controller 155 may also be coupled to a servo positioning control circuit 180 which provides a driving current to the VCM of the actuator 105.

As previously discussed, the VCM provides a torque to rotate the actuator arms into a desired position.

The controller 155 may be connected to a read-only memory (ROM) device 160 and a random-access memory (RAM) device 165. The memory devices 160 and 165 may contain instructions and data that are used by the controller 155 to perform software routines or for temporary storage of servo information to be copied to the servo-copy disks. One of the software routines may be a seek routine which directs the read/write heads to move from one track to a target track. Another software routine may be a track following routine whereby servo information on a disk surface is read as a read/write head 110 moves along a desired track on the disk. A Position Error Signal (PES) is generated using servo information read during the track following operation. The PES represents a measurement of the ideal tracking position for the read/write head 110 versus the actual position of the head. The track following routine may then interpret this signal and issue proportional analog output to the actuator motor drive. Thereafter, the VCM may move the actuator so as to correct any error in the servo head position. This process is repeated in an iterative manner to enable the read/write head 110 to read information from a given track in a precise manner.

Figure 5:
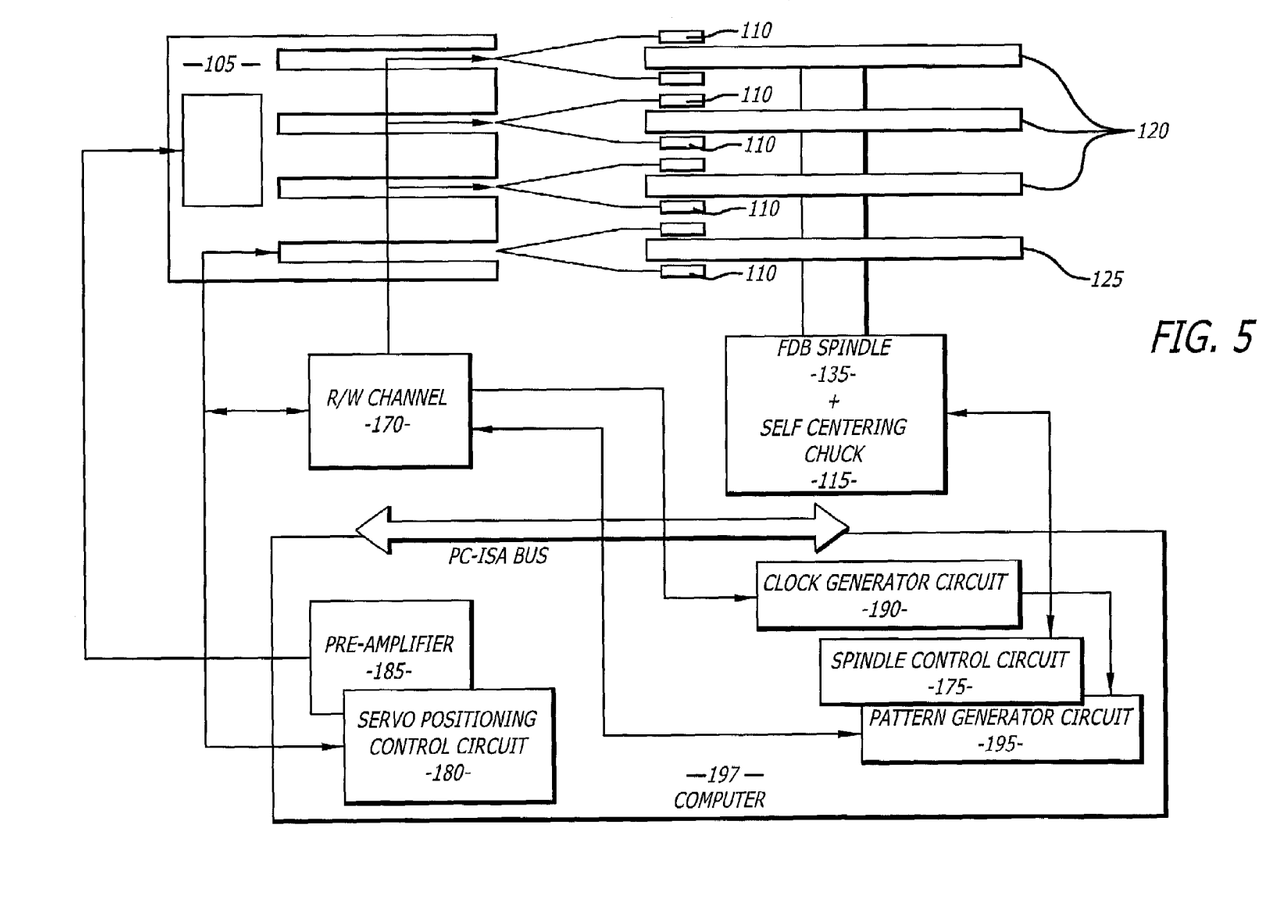
FIG. 5 is another embodiment of an offline servo track writer.

FIG. 5 depicts another embodiment of the arrangement of an offline servo track writer. In this embodiment, the servo positioning control circuit 180, pre-amplifier 185 and spindle control circuit 175 are part of computer 197. In addition, computer 197 may contain a clock generator circuit 190 used to interpret a clock signal provided by a timing pattern on the reference disk 125 and to provide a timing signal to the pattern generator circuit 195. The pattern generator circuit 195 may then use the timing signal from the clock generator circuit 190 and the servo pattern from the reference disk 125 to direct the R/W heads 110 to translate (copy) servo information onto the servo-copy disks 120.

Figure 6:
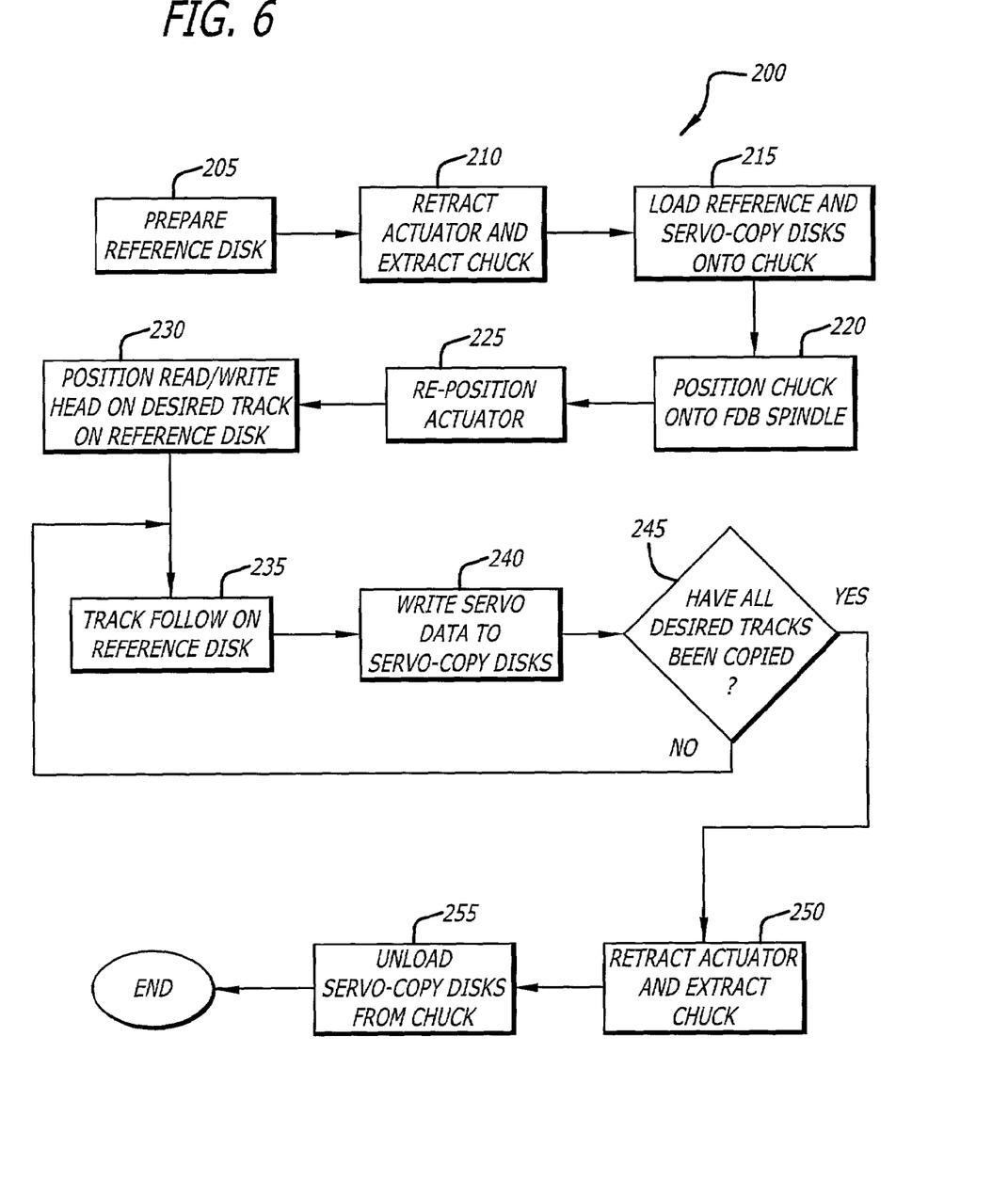
FIG. 6 is a flow chart of one embodiment for producing a servo-copy disk.

Referring now to FIG. 6, a process 200 for creating servo-copy disks, according to one embodiment, is shown. The process 200 begins with the preparation of the reference disk at block 205. As mentioned earlier, the reference disk 125 may be generated using a traditional offline servo track writer, may be pre-encoded with a phase modulated servo pattern or may be encoded using another commonly known method. At block 210, the actuator 105 is retracted using slide-motion mechanism 130 and the chuck 115 is removed. The servo-copy disks 120 and reference disk 125 is then loaded onto the chuck 115 at block 215. The chuck 115 is then positioned onto the FDB spindle 135 and the slide-motion mechanism 130 moves the actuator 105 and actuator arms 112 back into read/write position (blocks 220 and 225, respectively).

The process 200 then proceeds by positioning the read/write head 110 associated with the reference disk 125 over a desired track containing servo information (block 230). In one embodiment, only a read head is associated with the reference disk 125. In another embodiment, the positioning is accomplished using servo software stored at memory devices 160 and 165, and/or on a memory device attached to user interface 150. Thereafter, the servo software directs the offline servo track writer 100 to track follow on the reference disk 125 (block 235).

At block 240, the desired servo information is written to servo-copy disks 120. As discussed earlier, servo information transferred to the servo-copy disks may be patterned to be consistent with an embedded servo sector system or may consist of servo information consistent with a dedicated servo system. Moreover, in one embodiment, the servo information is copied by sequentially reading from the reference disk 125 and then writing to the servo disks 120. In another embodiment, the servo information may be temporarily stored at ROM 160 and/or RAM 165 once it is read from the reference disk 125 and before it is written to the servo-copy disks 120. It should further be appreciated that the servo information may be copied in one read/write operation, or may be copied in successive read/write operations where a predetermined portion of the servo information is first read from the reference disk 125 and then written to the servo-copy disks 120.

At decision block 245, a determination is made as to whether all of the desired servo information has been copied to the servo-copy disks 120. If not, the process 200 repeats blocks 235–245. If so, the actuator 105 is retracted to enable the chuck 115 to be extracted (block 250). Thereafter, the servo-copy copy disks and the reference disk 125 may be removed from the chuck and incorporated into the disk stack of a hard disk drive assembly. In another embodiment, only the servo-copy disks 120 are removed, with the reference disks 125 remaining in place. Where the reference disk 125 is to remain on the chuck, it should be the bottom disk to enable easier removal of the servo-disks 120 without the need to remove the reference disk 125.

Figure 7:
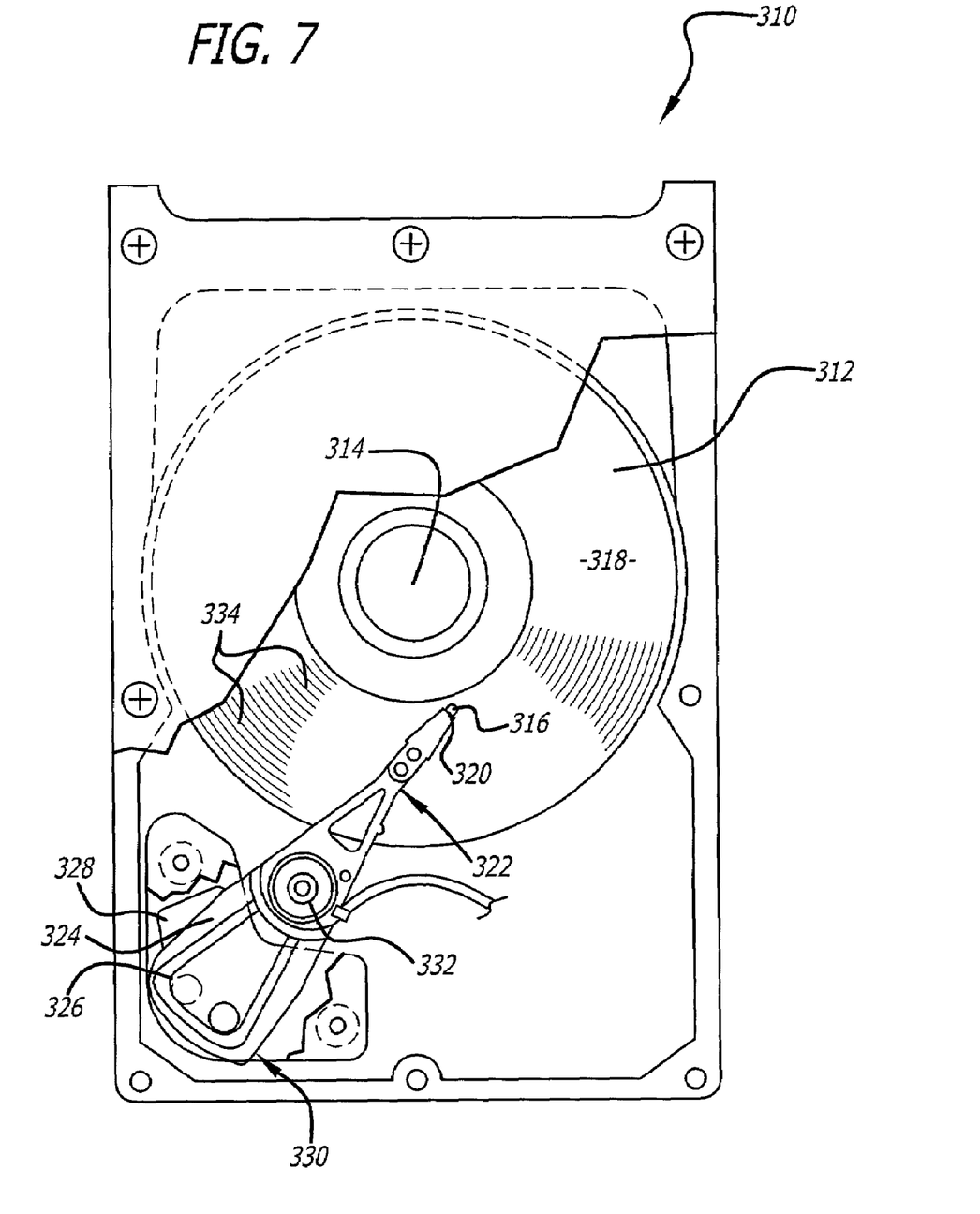
FIG. 7 illustrates a hard disk drive that makes use of a servo-copy disk, according to one embodiment.

Referring now to FIG. 7 which shows one embodiment of a hard disk drive 310 containing a disk stack 312 that is rotated by a spin motor 314. The drive 310 may also include a transducer 316 located adjacent to a disk surface 318. In one embodiment, the disk stack 312 contains one servo-copy disk 120. In another embodiment, the disk stack contains a plurality of servo-copy disks 120. Where the servo-copy disk 120 is to be used in a dedicated servo system, only one servo-copy disk 120 need be incorporated into the disk stack. Where the servo-copy disk 120 is to be incorporated into an embedded sector servo system, all of the disks in the disk stack may be servo-copy disks 120. Alternatively, only one disk in the disk stack need be a servo-copy disk 120 where the servo information on the servo-copy disk 120 is to be transferred to the other disks in the disk stack after the hard disk drive is assembled.

The transducer 316 can write and read information on a rotating disk on the disk stack 312 by magnetizing and sensing the magnetic field of a disk surface 318. Although a single transducer 316 is shown and described, it is to be understood that there may be a write transducer for magnetizing the disk 312 and a separate read transducer for sensing the magnetic field of a disk surface 318. The read transducer may be constructed from a magneto-resistive (MR) material.

The transducer 316 can be integrated into a slider 320. The slider 320 may be constructed to create an air bearing between the transducer 316 and the disk surface 318. The slider 320 may be constructed to create an air bearing between the transducer 316 and the disk surface 318. The slider 320 may be incorporated into a head gimbal assembly ("HGA") 322. The HGA 322 may be attached to an actuator arm 324 which has a voice coil 326. The voice coil 326 may be located adjacent to a magnet assembly 328 to define a VCM 330. Providing a current to the voice coil 326 will generate a torque that rotates the actuator arm 324 about a bearing assembly 332. Rotation of the actuator arm 324 will move the transducer 316 across the disk surface 318.

The embodiments disclosed herein may be implemented as a method, apparatus, system, computer program product, etc. When implemented in software, the elements are essentially the code segments to perform the necessary tasks. The program or code segments can be stored in a processor readable medium, which includes any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, etc.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for servo track writing comprising:
   coupling a reference disk and a copy disk to a chuck and a spindle motor of a servo track writer;
   reading the servo information on the reference disk with a read head of the servo track writer;
   writing said servo information onto a copy disk using a write head of said servo track writer before said copy disk is incorporated into a hard disk drive assembly;
   removing the chuck, the reference disk and the copy disk from the spindle motor;
   replacing the copy disk; and,
   repeating the process of reading servo information from the reference disk and write the servo information on the copy disk.

2. The method of claim 1 wherein reading the reference disk comprises performing a track following operation, where said track following operation comprises:
   positioning said read head at a first track on said reference disk;
   following at least a portion of said first track with said read head, said reference disk to be rotated using a fluid dynamic bearing spindle;
   determining a position error signal for said read head;
   correcting a position of said read head using said position error signal; and,
   reading servo information from at least said portion using said read head.

3. The method of claim 1 further comprising rotating said reference disk and said copy disk using a fluid dynamic bearing spindle.

4. The method of claim 1 wherein writing said servo information to the disk comprises writing a plurality of burst signals to the disk, said burst signals to be read by a drive head of said hard disk drive assembly to determine a position of said drive head.

5. The method of claim 1 wherein reading the reference disk comprises reading the reference disk with a read head of the servo track writer where said reference disk is encoded with a phase modulated servo pattern.

6. The method of claim 1 wherein reading the reference disk comprises reading the reference disk with a read head of the servo track writer where said servo information is recorded onto said reference disk using an offline servo track writer.

7. The method of claim 1 further comprising incorporating said copy disk into a disk stack of said hard disk drive assembly, copying at least a portion of said servo information onto a blank disk that is on said disk stack, and using said servo information to determine a position of a drive head of said hard disk drive assembly.

8. The method of claim 1 wherein writing said servo information onto said copy disk comprises writing said servo information onto said copy disk where said servo information and said disk copy are to be used in a dedicated servo system.

9. A servo track writer comprising:
   an actuator having a plurality of actuator arms;
   a read head connected to one of said actuator arms;
   a write head connected to another of said actuator arms;
   a spindle;
   a chuck to secure a reference disk and a copy disk onto a spindle, said spindle to rotate said reference disk and said copy disk, said chuck being detachable from said spindle to replace said copy disk; and,
   a controller to:
      read servo information on the reference disk with said read head; and,
      write said servo information onto said copy disk using said write head before incorporating said copy disk into a hard disk drive assembly.

10. The servo track writer of claim 9 wherein said controller further is to:
    position said read head at a first track on said reference disk;
    follow at least a portion of said first track with said read head;
    determine a position error signal for said read head;
    correct a position of said read head using said position error signal; and
    read said servo information from at least said portion using said read head.

11. The servo track writer of claim 10 further comprising a plurality of copy disks and a plurality of write heads associated therewith.

12. The servo track writer of claim 10 wherein said servo information is to be stored in memory before being written to said copy disk.

13. The servo track writer of claim 9 wherein said spindle comprises a fluid dynamic bearing spindle.

14. The servo track writer of claim 9, wherein said reference disk is encoded with a phase modulated servo pattern.

15. The servo track writer of claim 9, wherein said servo information is recorded onto said reference disk using an offline servo track writer.

16. The servo track writer of claim 9 wherein said copy disk is to be incorporated into a disk stack of a hard disk drive assembly after said servo information has been written onto said copy disk, said servo information on said copy disk to be used to determine a position of a drive head in said hard disk drive assembly where said hard disk drive assembly utilizes a dedicated servo system.

17. The servo track writer of claim 9, wherein said copy disks are to be incorporated into a disk stack of a hard disk drive assembly alter said servo information has been written onto said copy disk, said servo information on said copy disk to be copied onto a blank disk in said bard disk drive assembly where said hard disk drive assembly utilizes an embedded sector servo system.

18. A servo track writer comprising:
    an actuator having a plurality of actuator arms and heads attached thereto;
    spindle means to rotate a reference disk and a copy disk, said reference disk to contain a plurality of tracks having servo information to be read by at least one of said heads;
    means to secure and detach said reference disk and said copy disk to and from said spindle means;

means to perform a track following operation on said reference disk;

means to read said servo information from said reference disk and write said servo information onto said copy disk before said copy disk is incorporated into a hard disk drive assembly.

19. The servo track writer of claim 18 wherein said means to perform the track following operation comprises:

means for positioning a first head on a track on said reference disk;

means for following at least a portion of said track with said first head;

means for determining a position error signal for said first head;

means for correcting a position of said first head using said position error signal; and means for reading said servo information from at least said portion with said first head.

20. The servo track writer of claim 18, further comprising means for incorporating said copy disk into said hard disk drive assembly, said copy disk to contain said servo information copied from said reference disk.

21. A servo track writer comprising:

an actuator having a plurality of actuator arms;

a read head connected to one of said actuator arms;

a write head connected to another of said actuator arms; and, a fluid dynamic bearing spindle, said fluid dynamic bearing spindle to rotate a reference disk and a copy disk in a servo track writing operation;

a spindle;

a chuck to secure the reference disk and the servo-copy disk to said fluid dynamic bearing spindle, said chuck being detachable from said spindle to replace said copy disk;

a controller to:

perform a track following operation to read servo information on said reference disk; and, write said servo information onto said copy disk using said write head before incorporating said copy disk into a hard disk drive assembly.

22. The servo track writer of claim 21 wherein said track following operation comprises:

positioning said read head at a first track on said reference disk;

following at least a portion of said first track with said read head;

determining a position error signal for said read head;

correcting a position of said read head using said position error signal; and reading said servo information from at least said portion using said read head.

23. The servo track writer of claim 21 further comprising a plurality of copy disks each having a head associated therewith capable of writing information to said copy disks.

24. The servo track writer of claim 21 wherein said copy disk is to be incorporated into a disk stack of a hard disk drive assembly after said servo information has been written onto said copy disk, said servo information on said copy disk to be used to determine a position of a drive head of said hard disk drive assembly where said hard disk drive assembly utilizes a dedicated servo system.

25. The servo track writer of claim 21, wherein said copy disks are to be incorporated into a disk stack of a hard disk drive assembly after said servo information has been written onto said copy disk, said servo information on said copy disk to be copied onto a blank disk in said hard disk drive assembly where said hard disk drive assembly utilizes an embedded sector servo system.

26. The servo track writer of claim 21, wherein said fluid dynamic bearing spindle is an oil bearing spindle.

* * * * *